(12) United States Patent
Smith et al.

(10) Patent No.: US 8,224,591 B2
(45) Date of Patent: Jul. 17, 2012

(54) METHOD, SYSTEM, AND COMPUTER SOFTWARE CODE FOR VERIFICATION OF VALIDITY OF A PRESSURE TRANSDUCER

(75) Inventors: Eugene A. Smith, Satellite Beach, FL (US); David Carroll Teeter, Melbourne, FL (US); John William Brand, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 407 days.

(21) Appl. No.: 12/504,028

(22) Filed: Jul. 16, 2009

(65) Prior Publication Data

US 2011/0015876 A1    Jan. 20, 2011

(51) Int. Cl.
*G06F 15/00*    (2006.01)
(52) U.S. Cl. ........................................................ 702/41
(58) Field of Classification Search ...................... 702/41
See application file for complete search history.

(56) References Cited

U.S. PATENT DOCUMENTS

| 4,553,723 A | 11/1985 | Nichols et al. |
| 6,375,276 B1 | 4/2002 | Delaruelle |
| 2006/0220453 A1 * | 10/2006 | Saito et al. ................... 303/152 |

* cited by examiner

*Primary Examiner* — Tung S Lau
(74) *Attorney, Agent, or Firm* — GE Global Patent Operation; John A. Kramer

(57) ABSTRACT

A system for verifying validity of a pressure reading from a transducer on a remote powered system, the system including a comparator subsystem configured to evaluate a pressure reading differential taken between a first transducer that is part of a braking system on a lead powered system and a second transducer that is a part of a braking system on a remote powered system, wherein the pressure reading differential is taken when the lead powered system and the remote powered system are operating in a distributed power application. A method and computer software code, stored on a computer readable media and executable with a processor, are also disclosed for verifying validity of a pressure reading from a transducer on a remote powered system.

20 Claims, 5 Drawing Sheets

METHOD, SYSTEM, AND COMPUTER SOFTWARE CODE FOR VERIFICATION OF VALIDITY OF A PRESSURE TRANSDUCER

BACKGROUND OF THE INVENTION

This invention relates generally to communication systems and, more particularly, to determining whether a reading from a pressure transducer is valid.

Powered systems such as, but not limited to, an off-highway vehicle, marine powered propulsion plant or marine vessel, rail vehicle systems or trains, stationary power plants, agricultural vehicles, and transport vehicles, usually are powered by a power unit, such as but not limited to a engine, such as but not limited to a diesel engine. With respect to rail vehicle systems, the powered system is a locomotive, which may be part of a train that further includes a plurality of rail cars, such as freight cars. Usually more than one locomotive is provided as part of the train, where a grouping of locomotives is referred to as a locomotive "consist." Locomotives are complex systems with numerous subsystems, with each subsystem being interdependent on other subsystems.

With respect to a train, under operator control, a railroad locomotive supplies motive power (traction) to move the locomotive and a load (e.g., non-powered railcars and their contents), and applies brakes on the locomotive and/or on the non-powered railcars to slow or stop the train. With respect to the locomotive, the motive power is supplied by electric traction motors responsive to an AC or DC power signal generated by the locomotive engine.

A railroad train has three separate brake systems. An air brake system includes a fluid-carrying (typically the fluid includes air) brake pipe that extends a length of the train and a railcar brake system. Wheel brakes are applied or released at each locomotive and at each railcar in response to a fluid pressure in the brake pipe. An operator-controlled brake handle controls the brake pipe pressure, venting the brake pipe to reduce the pressure to signal the locomotives and railcars to apply the brakes, or charging the brake pipe to increase the pressure to signal the locomotive and railcars to release the brakes. For safe train operation, when pressure in the brake pipe falls below a threshold value the brakes default to an applied condition.

Each locomotive also has an independent pneumatic brake system controlled by the operator to apply or release the locomotive brakes. The independent pneumatic brake system, which is coupled to the air brake system, applies the locomotive brakes by increasing the pressure in the locomotive brake cylinders and releasing the locomotive brakes responsive to a decrease in the cylinder air pressure.

Finally, each locomotive is equipped with a dynamic brake system. Activation of the dynamic brakes reconfigures the locomotive's traction motors to operate as generators, with the inertia of the locomotive wheels supplying rotational energy to turn the generator rotor winding. Magnetic forces, developed by generator action, resist wheel rotation and thus create wheel-braking forces. The energy produced by the generator is dissipated as heat in a resistor grid in the locomotive and removed by one or more cooling blowers. Use of the dynamic brakes is indicated to slow the train when application of the locomotive independent brakes and/or the railcar air brakes may cause the locomotive or railcar wheels to overheat or when prolonged use may cause excessive wheel wear. For example, the dynamic brakes may be applied when the train is traversing a prolonged downgrade.

A train configured for distributed power (DP) operation has a lead locomotive at a head-end of the train, and one or more remote locomotives between the head-end and an end of the train. A DP train may also include one or more locomotives at the end of the train. The DP system further includes a distributed power train control and communications system with a communications channel (e.g., a radio frequency (RF) or a wire-based communications channel) linking the lead and remote locomotives. Though DP operation is disclosed specific to trains, similar systems are also applicable for other powered systems disclosed herein.

The DP system generates traction and brake commands responsive to operator-initiated (e.g., the operator in the lead locomotive) control of a lead locomotive traction controller (or throttle handle) or a lead locomotive brake controller (responsive to operation of an air brake handle, a dynamic brake handle or an independent brake handle). These traction or brake commands are transmitted to the remote locomotives over the DP communications channel. The receiving remote locomotives respond to the traction or brake (apply and release) commands to apply tractive effort or to apply/release the brakes and further advise the lead locomotive that the command was received and executed. For example, when the lead locomotive operator operates the lead-locomotive throttle controller to apply tractive effort at the lead locomotive, according to a selected throttle notch number, the DP system issues commands to each remote locomotive to apply the same tractive effort (e.g., the same notch number). Each remote locomotive replies to acknowledge execution of the command.

In certain DP systems, a plurality of pressure transducers are used in an equalizing/control reservoir, brake pipe, brake cylinder, etc. at the lead locomotive and at each remote locomotives to sense when the lead locomotive makes a brake application and allows each remote locomotive to make a similar brake application. This allows for uniform braking to take place, which in turn keeps in-train forces at acceptable limits.

FIG. 1 schematically illustrates an exemplary distributed power train 10, traveling in a direction indicated by an arrowhead 11. A remote locomotive 12A (also referred to as a remote unit) is controlled by messages transmitted from either a lead locomotive 14 (also referred to as a lead locomotive) or from a control tower 16. Control tower commands are issued by a tower operator or dispatcher either directly to the remote locomotive 12A or to the remote locomotive 12A via the lead locomotive 14.

A trailing locomotive 15 coupled to the lead locomotive 14, forming a consist, is controlled by the lead locomotive 14 via control signals carried on an MU (multiple locomotive) line 17 connecting the two units. Also, a trailing remote locomotive 12B coupled to the remote locomotive 12A, forming another consist, is controlled by the remote locomotive 12A via control signals carried on the MU line 17.

Each of the locomotives 14 and 12A and the control tower 16 includes a DP transceiver 28L, 28R, 28T (also referred to as a DP radio) and a DP antenna 29 for receiving and transmitting the DP communication messages. The DP transceivers are referred to by suffixed reference numerals 28L, 28R and 28T indicating location in the lead locomotive, remote locomotive, and the control tower, respectively.

The DP commands are typically generated in a lead station 30L in the lead unit 14 responsive to operator control of the motive power and braking controls in the lead locomotive 14, as described above. The remote locomotive 12A also includes a remote station 32R for processing messages from the lead locomotive 14 and for issuing reply messages and commands.

The distributed power train 10 further comprises a plurality of railcars 20 interposed between the locomotives illustrated in FIG. 1 and connected to a brake pipe 22. The railcars 20 are provided with an air brake system (certain components of which are not shown in FIG. 1) that applies the railcar air brakes in response to a pressure drop in the brake pipe 22 and releases the air brakes in response to a pressure increase in the brake pipe 22. The brake pipe 22 runs the length of the train for conveying the air pressure changes specified by air brake controllers 24 in the locomotives 14 and 12A. A plurality of transducers 69 is provided. The plurality of transducers 69 are associated with the equalizing/control reservoir, brake pipe, and brake cylinder at each brake controller 24 at each lead and remote locomotive. The transducers 69 communicate with the lead station 30L in the lead locomotive 14 to identify the brake application that the driver is commanding at the lead locomotive. The lead station then transmits this brake application data to the remote station 32R via the DP radios 28L and 28R. The remote station 32R then commands the remote brake controllers 24 to apply brakes as commanded from the lead locomotive. The transducers 69 communicate with the remote station 32R in the remote locomotive 12A to identify that the remote locomotive 12A is making its braking application in response to the braking application made by the lead locomotive 14.

In distributed power applications, it is especially critical to have valid and accurate pressure transducer data. During times of communication interruption, if a brake application is applied at the lead locomotive, the remote locomotive cannot receive this brake command and the lead locomotive may apply brakes at the front part of the train very rapidly while the rear part of the train the brakes are being applied at a much slower rate. Such an application of brakes may result in experiencing high in-train forces, which are unacceptable during train motoring. Additionally, pressure transducers may fail at an acceptable pressure and provide a false reading to the lead locomotive, or, more specifically, a train control system. This false reading will indicate to the system that it is safe to operate in a nominal state. The false reading might allow the system to make an unacceptable action.

Therefore, owners and operators of locomotives and trains would benefit from being able to detect when a failed or stuck pressure transducer is realized where the detection ensures that the data associated with the detection is current data. Owners and operators would also benefit from having fewer working parts in the distributed power system; therefore, an additional benefit would be realized if the detection is accurate enough to reduce the number of redundant transducers currently required.

BRIEF DESCRIPTION OF THE INVENTION

Embodiments of the present invention relate to a method, system, and computer software code for verifying validity of a pressure reading from a transducer on a remote powered system. The system comprises a comparator subsystem configured to evaluate a pressure reading differential taken between a first transducer that is part of a braking system on a lead powered system and a second transducer that is a part of a braking system on a remote powered system, wherein the pressure reading differential is taken when the lead powered system and the remote powered system are operating in a distributed power application. (Distributed power "application" or "mode" means coordinated control of braking, power/traction, and/or other operations as between two or more linked powered systems, e.g., the lead and remote powered systems.)

The method comprises comparing pressure measured at a first transducer to pressure measured at a second transducer to determine whether the second transducer functions properly when the powered system is operating in a distributed power mode.

The computer software code is stored on a computer readable media and is executable with a processor. The computer software code comprises a computer software module for comparing pressure measured at a first transducer to pressure measured at a second transducer to determine whether the second transducer functions properly when the powered system is operating in a distributed power mode.

A method for verifying operation of a pressure transducer comprises obtaining a first pressure reading from a first transducer in a first rail vehicle, wherein the first pressure reading relates to a braking pressure in the first rail vehicle. The method further comprises obtaining a second pressure reading from a second transducer in a second rail vehicle, wherein the second pressure reading relates to a braking pressure in the second rail vehicle, and wherein the first and second pressure readings are taken when the first and second rail vehicles are operating in a distributed power application, said first and second rail vehicles being indirectly or directly linked together as part of a series of linked rail vehicles. The method also comprises carrying out a comparison of the first pressure reading to the second pressure reading, and determining whether the second transducer is functioning within designated operational parameters based on the comparison.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION OF THE INVENTION

Figure 1:
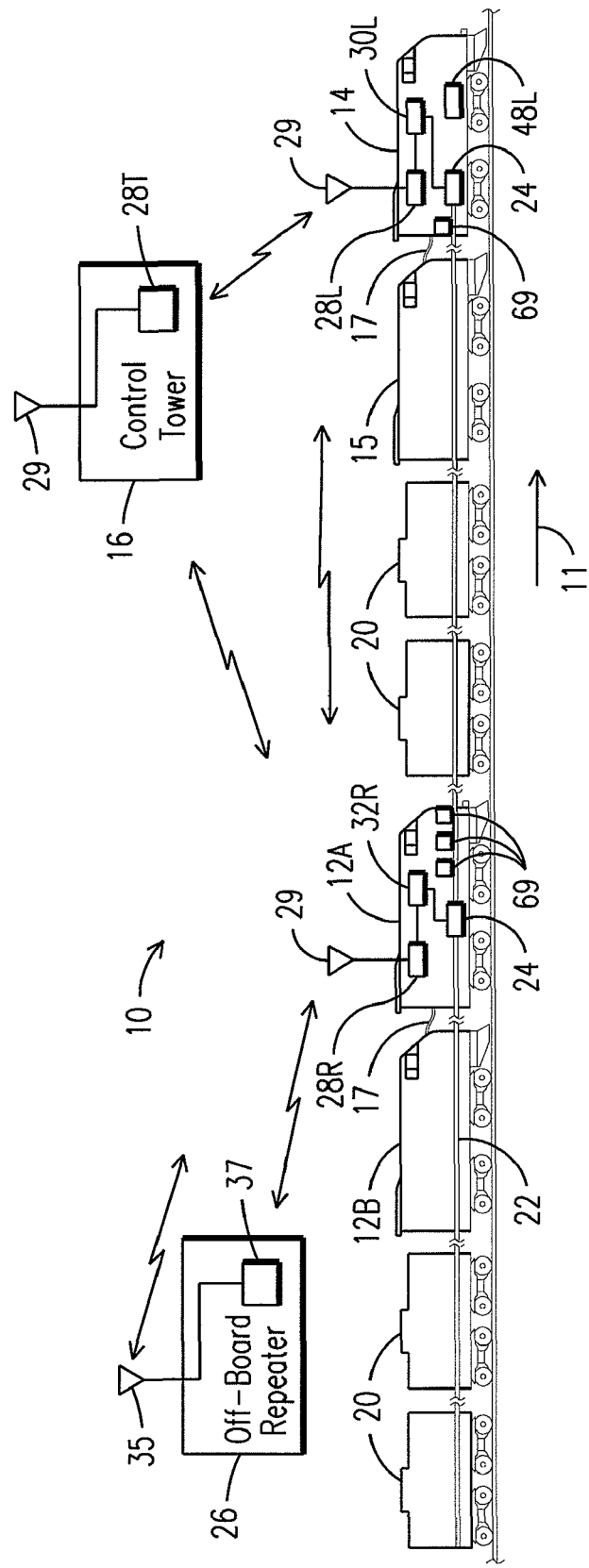
FIG. 1 illustrates a prior art representation of a distributed power train.

Reference will be made below in detail to exemplary embodiments of the invention, examples of which are illustrated in the accompanying drawings. Wherever possible, the same reference numerals used throughout the drawings refer to the same or like parts. As disclosed below, multiple versions of a same element may be disclosed. Likewise, with respect to other elements, a singular version is disclosed. Neither multiple versions disclosed nor a singular version disclosed shall be considered limiting. Specifically, although multiple versions are disclosed, a singular version may be utilized. Likewise, where a singular version is disclosed, multiple versions may be utilized.

Though exemplary embodiments of the present invention are described with respect to rail vehicles, or railway transportation systems, specifically trains and locomotives, exemplary embodiments of the invention are also applicable for use with other powered systems, such as but not limited to marine vessels, stationary units such as power plants, off-highway vehicles, agricultural vehicles, and/or transportation vehicles, each which may use at least one engine. Towards this end, when discussing a specified mission, this includes a task or requirement to be performed by the powered system. Therefore, with respect to a railway vehicle, marine vessel, agricultural vehicle, transportation vehicle, or off-highway vehicle applications, this may refer to the movement of a collective powered system (where more than one individual powered system is provided) from a present location to a destination. In the case of stationary applications, such as but not limited to a stationary power generating station or network of power generating stations, a specified mission may refer to an amount of wattage (e.g., MW/hr) or other parameter or requirement to be satisfied by the powered system.

Though diesel powered systems are readily recognized when discussing trains or locomotives, those skilled in the art will readily recognize that embodiments of the invention may also be utilized with non-diesel powered systems, such as but not limited to natural gas powered systems, bio-diesel powered systems, etc. Furthermore, the individual powered system may include multiple engines, other power sources, and/or additional power sources, such as, but not limited to, battery sources, voltage sources (such as but not limited to capacitors), chemical sources, pressure based sources (such as but not limited to spring and/or hydraulic expansion), electrical current sources (such as but not limited to inductors), inertial sources (such as but not limited to flywheel devices), gravitational-based power sources, and/or thermal-based power sources. Additionally, the power source may be external, such as, but not limited to, an electrically powered system, such as a locomotive or train, where power is sourced externally from overhead catenary wire, a third rail, and/or magnetic levitation coils.

Exemplary embodiments of the invention solve problems in the art by providing a method, system, and computer implemented method, such as a computer software code or computer readable media, for verifying validity of a pressure reading from a transducer on a remote powered system. With respect to locomotives, exemplary embodiments of the present invention are operable when the locomotive consist is in distributed power operations. Distributed power operations, however, are not only applicable to locomotives or trains. The other powered systems disclosed herein may also operate in a distributed power configuration.

In this document the term "locomotive consist" is used. As used herein, a locomotive consist may be described as having one or more locomotives in succession, connected together so as to provide motoring and/or braking capability. The locomotives are connected together where no train cars are in between the locomotives. The train can have more than one locomotive consists in its composition. Specifically, there can be a lead consist and one or more remote consists, such as midway in the line of cars and another remote consist at the end of the train. Each locomotive consist may have a first locomotive and trail locomotive(s). Though a first locomotive is usually viewed as the lead locomotive, those skilled in the art will readily recognize that the first locomotive in a multi locomotive consist may be physically located in a physically trailing position.

Though a locomotive consist is usually viewed as involving successive locomotives, those skilled in the art will readily recognize that a consist group of locomotives may also be recognized as a consist even when one or more rail cars separate the locomotives, such as when the locomotive consist is configured for distributed power operation, wherein throttle and braking commands are relayed from the lead locomotive to the remote trains by a radio link or physical cable. Towards this end, the term locomotive consist should not be considered a limiting factor when discussing multiple locomotives within the same train.

As disclosed herein, the idea of a consist may also be applicable when referring to other types of powered systems including, but not limited to, marine vessels, off-highway vehicles, agricultural vehicles, and/or stationary power plants, that operate together so as to provide motoring, power generation, and/or braking capability. Therefore, even though the term locomotive consist is used herein in regards to certain illustrative embodiments, this term may also apply to other powered systems. Similarly, sub-consists may exist. For example, the powered system may have more than one power generating unit. For example, a power plant may have more than one diesel electric power unit where optimization may be at the sub-consist level. Likewise, a locomotive may have more than one diesel power unit. Furthermore though the exemplary examples are disclosed with respect to a rail vehicle, such disclosures are not to be considered limiting. The exemplary embodiments are also applicable to the other powered systems disclosed herein.

Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk, computer readable media, or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, a technical effect is to verify validity of a pressure reading from a transducer on a remote powered system. To facilitate an understanding of the exemplary embodiments of the invention, it is described hereinafter with reference to specific implementations thereof. Exemplary embodiments of the invention may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that perform particular tasks or implement particular abstract data types. For example, the software programs that underlie exemplary embodiments of the invention can be coded in different programming languages, for use with different devices, or platforms. In the description that follows, examples of the invention may be described in the context of a web portal that employs a web browser. It will be appreciated, however, that the principles that underlie exemplary embodiments of the invention can be implemented with other types of computer software technologies as well.

Moreover, those skilled in the art will appreciate that exemplary embodiments of the invention may be practiced with other computer system configurations, including multiprocessor systems, microprocessor-based or programmable consumer electronics, minicomputers, mainframe computers, and the like. Exemplary embodiments of the invention may also be practiced in distributed computing environments where tasks are performed by remote processing devices that are linked through at least one communications network. In a distributed computing environment, program modules may be located in both local and remote computer storage media including memory storage devices.

Referring now to the drawings, embodiments of the present invention will be described. Exemplary embodiments of the invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

Figure 2:
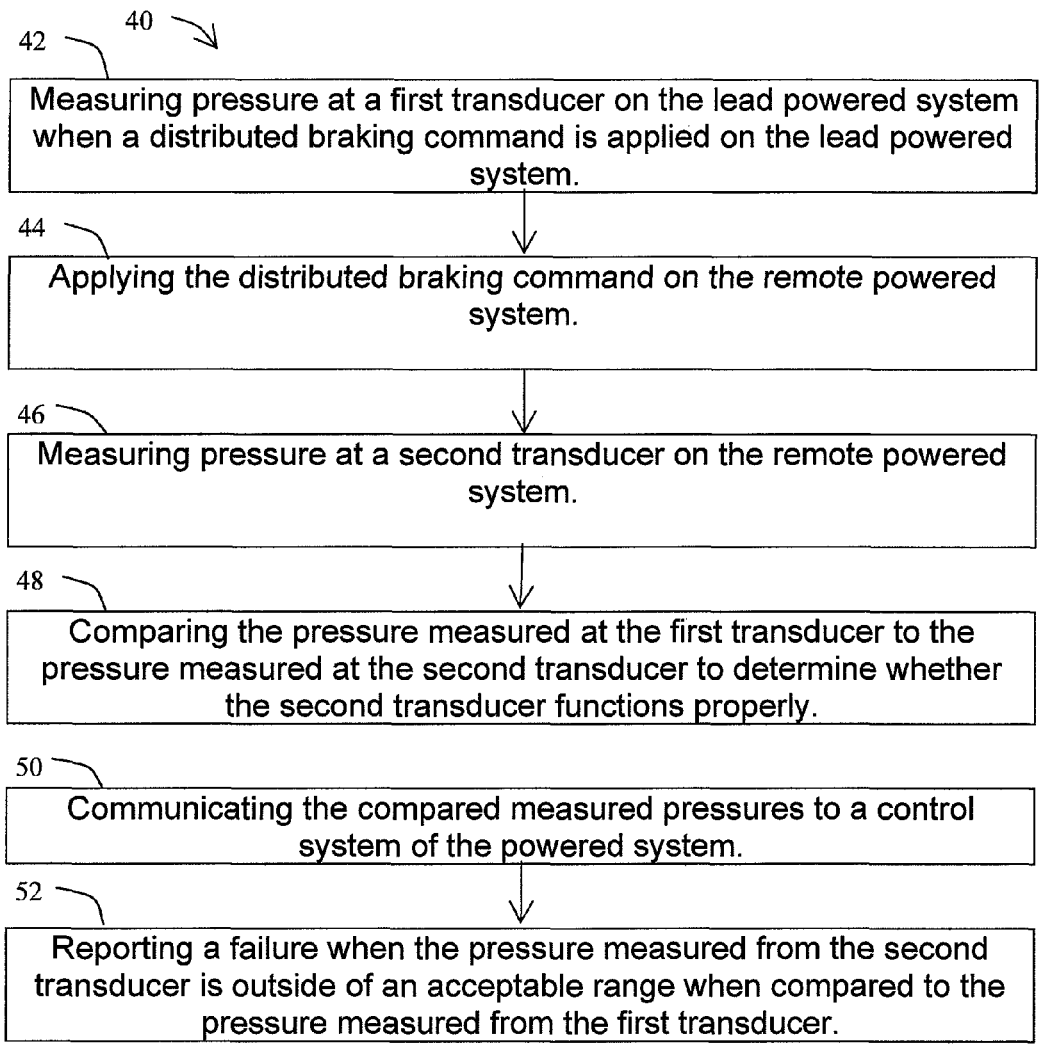
FIG. 2 depicts a flowchart illustrating an exemplary method for verifying validity of a pressure reading from a transducer on a remote powered system in a distributed power powered system.

FIG. 2 depicts a flowchart illustrating a method for verifying validity of a pressure reading from a transducer on a remote powered system in a distributed power powered system, e.g., the distributed power powered system including the remote powered system and a lead powered system. The method in the flowchart 40 comprises measuring pressure at a first transducer on the lead powered system when a distributed braking command is applied on the lead powered system, at 42. The method continues, at 44, with applying the distributed braking command on the remote powered system. Pressure is measured at a second transducer on the remote powered system, at 46. The pressure measured at the first transducer is compared to the pressure measured at the second transducer to determine whether the second transducer functions properly, at 48. Comparing the pressure measured, at 48, may further comprise comparing the pressure measured based on a proportional difference and/or a direct difference over a nominal period of time. The compared measured pressures are communicated to a control system of the powered system, at 50. When the pressure measured from the second transducer is outside of a designated acceptable range when compared to the pressure measured from the first transducer, a failure is reported, at 52. In one embodiment, the proportional difference is an integral of a pressure difference over a time period used to create a threshold, whereas the direct difference is an absolute difference between any two discrete periods of time which are used to create the same, or nearly equivalent, threshold. The proportional difference and/or the direct difference may be used in a calculation for analyzing, or determining, air flow. Further information about analysis of air flow may be found in U.S. Pat. Nos. 6,375,276 or 4,553,723, both herein incorporated by reference.

Figure 3:
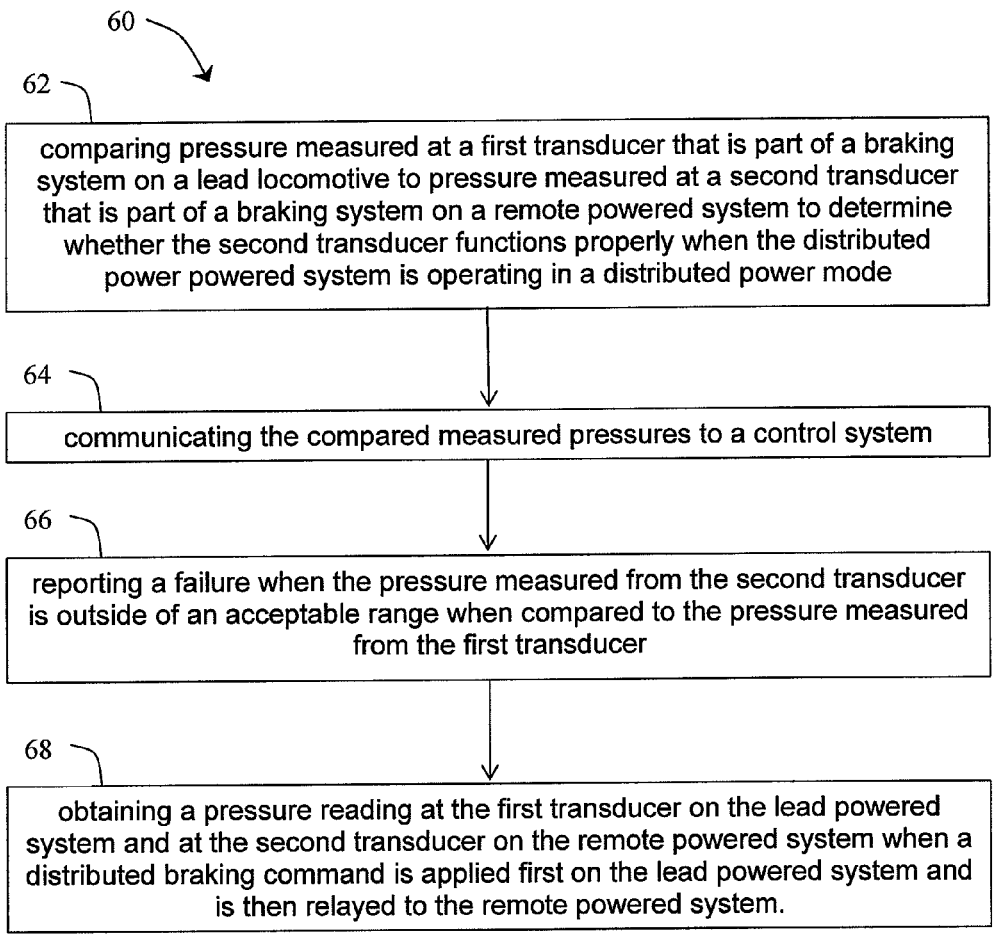
FIG. 3 depicts another flowchart illustrating an exemplary method for verifying validity of a pressure reading from a transducer on a remote powered system in a distributed power powered system.

FIG. 3 depicts a flowchart illustrating a method for verifying validity of a pressure reading from a transducer on a remote powered system in a distributed power powered system. The method in the flowchart 60 comprises comparing pressure measured at a first transducer that is part of a braking system on a lead powered system to pressure measured at a second transducer that is part of a braking system on a remote powered system to determine whether the second transducer functions properly when the distributed power powered system is operating in a distributed power mode, at 62. Comparing the pressure measured, at 62, further comprises comparing the pressure measured based on a proportional difference and/or a direct difference over a nominal period of time. The method further comprises communicating the compared measured pressures to a control system of the distributed power powered system, at 64. When the pressure measured from the second transducer is outside of an acceptable range when compared to the pressure measured from the first transducer, a failure is reported, at 66. The method further includes obtaining a pressure reading at the first transducer, that is part of the braking system on the lead powered system, and at the second transducer, that is part of the braking system on the remote powered system, when a distributed braking command is applied first on the lead powered system and is then relayed to the remote powered system, at 68.

The methods shown in flowcharts 40, 60 may be performed with a computer software code having computer software modules where the computer software code is stored on computer media and is executed with a processor. Thus each process flow in the flowcharts 40, 60 may be performed by a computer software module specific to the process contained in a specific process. For example, comparing pressure measured at a first transducer to pressure measured at a second transducer to determine whether the second transducer functions properly when the powered system is operating in a distributed power mode, at 62, may be performed with a computer software module for comparing pressure measured at a first transducer to pressure measured at a second transducer to determine whether the second transducer functions properly when the powered system is operating in a distributed power mode.

Those skilled in the art will also recognize that a processor 71 disclosed to implement the methods and as disclosed in FIG. 4 below is not a generic computer. Specifically, the processor 71 is unique to operate within an environment that it is exposed to when part of the powered system. Therefore a processor aboard the locomotive is not only specific to perform the methods disclosed above, but it is also able to withstand the environmental conditions experienced aboard the locomotive.

Figure 4:
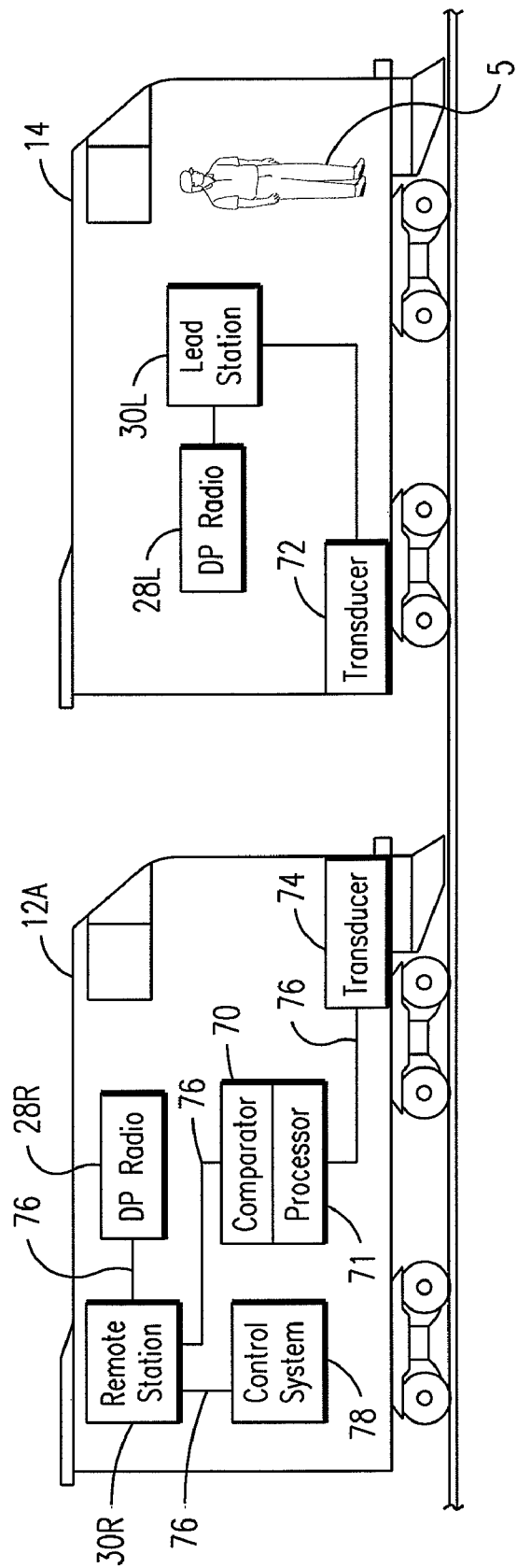
FIG. 4 illustrates, in block diagram form, elements for reporting and acting on a fault message.

FIG. 4 depicts an exemplary embodiment of a system for verifying validity of a pressure reading from a transducer on a remote powered system. For illustration purposes, FIG. 4 uses a train having a lead and remote locomotive. However, as disclosed above, this embodiment is application to a plurality of other powered systems operating together. The system comprises a comparator subsystem 70 located in the remote locomotive 12A, configured to evaluate a pressure reading differential taken between a first transducer 72 that is part of a braking system on a lead locomotive 14 and a second transducer 74 that is a part of a braking system on a remote locomotive 12A. The pressure reading differential is taken when the lead locomotive 14 and the remote locomotive 12A are operating in a distributed power application. The first transducer 72 pressure value is transmitted over a radio communication link established between the DP radio 28L at the lead and 28R at the remote. An operator 5 is also illustrated as being aboard the lead locomotive 14.

The comparator subsystem 70 comprises the processor 71 to compare a pressure reading from the first transducer 72 to a pressure reading from the second transducer 74. The pressure reading differential may be based on a proportional difference and/or a direct difference over a nominal period of time. The system further comprising a communication network 76 for reporting pressure data from the first transducer 72 to the brake system on the lead loco 14 and the second transducer 74 to the brake system on the remote loco 12A. More specifically, the pressure data from the second transducer 74 reports pressure data to the comparator subsystem 70 via the communication network 76. The comparator subsystem 70 and processor 71 may be integrated with the remote station 30R. The first transducer reports pressure data through the communication network 76 to the lead brake system 30L where it is then transmitted over the radio communication link to the remote locomotive 12A where it is reported to the comparator subsystem 70. The comparator subsystem 70 is also in communication with a control system 78 of the remote locomotive wherein pressure reading differential information is communicated to the control system 78. The control system 78 may also be integral with the remote station 30R.

In an exemplary embodiment, a control-area network ("CAN") bus may be utilized for communicating between the various elements in FIG. 4 that are on a specific locomotive. The DP radios 28L, 28R are provided to communicate between the locomotives. Using the CAN bus should result in actuate signals being transmitted and received at a high degree of integrity. Because of this integrity, a single transducer 74 may be used on the remote locomotive 12A.

In another exemplary embodiment, where a train has a lead consist and a trail consist, instead of having a transducer only on the lead locomotive in each consist, a transducer is included on each locomotive in each consist. Within each consist, the pressure data can be compared across each consist locomotive. In another embodiment the pressure data across each consist can then be compared to the other consist. For example, after data from each locomotive in a trial consist is compared, the collective consist data may be compared to the consist pressure data from the lead consist. Thus those skilled in the art will recognize that the lead locomotive and remote locomotive can be part of the same consist and/or may be part of separate consists.

Figure 5:
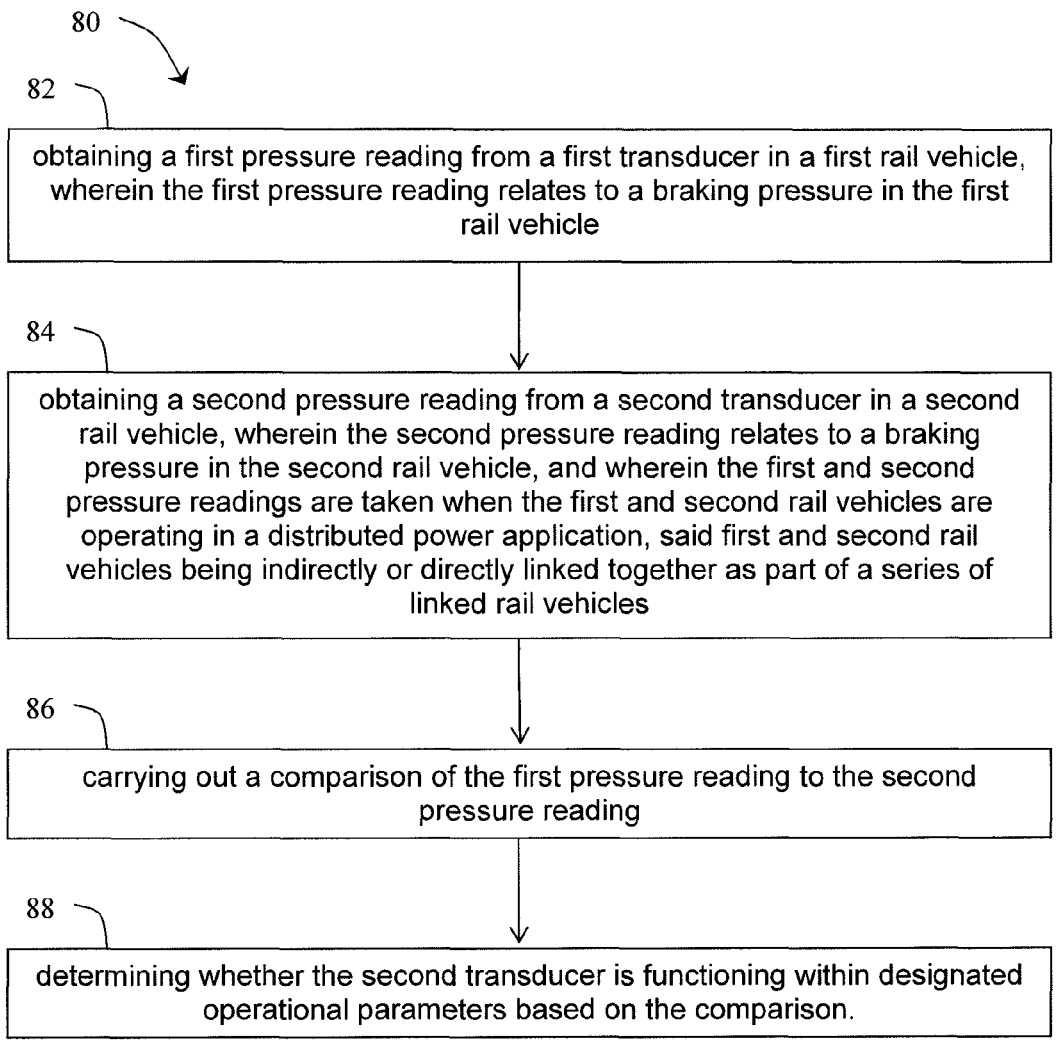
FIG. 5 depicts a flowchart illustrating an exemplary method for verifying operation of a pressure transducer.

Another embodiment relates to a method for verifying operation of a pressure transducer, as illustrated in FIG. 5. A flowchart 80 illustrates the method comprises obtaining a first pressure reading from a first transducer in a first rail vehicle, at 82. The first pressure reading relates to a braking pressure in the first rail vehicle. The method further comprises obtaining a second pressure reading from a second transducer in a second rail vehicle, at 84. The second pressure reading relates to a braking pressure in the second rail vehicle. The first and second pressure readings are taken when the first and second rail vehicles are operating in a distributed power application. The first and second rail vehicles are indirectly or directly linked together as part of a series of linked rail vehicles. The method further comprises carrying out a comparison of the first pressure reading to the second pressure reading, at 86, and determining whether the second transducer is functioning within designated operational parameters based on the comparison, at 88. ("Operational parameter" refers to an aspect or characteristic of the transducer in operation. "Designated" operational parameter refers to a particular value (or range of values) for each operational parameter that reflects a particular operational condition, such as nominal or proper operation.)

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A system comprising:
a control subsystem configured to control at least one of braking or traction operations of a vehicle system that includes a first powered unit and a second powered unit that is remote from the first powered unit, each of the first and second powered units configured to provide a tractive effort to propel the vehicle system; and
a comparator subsystem configured to evaluate a difference between a first pressure reading received from a first transducer that is part of a braking system on the first powered unit and a second pressure reading received from a second transducer that is part of a braking system on the second powered unit, wherein the comparator subsystem is configured to determine the difference in the first and second pressure readings when the first powered unit and the second powered unit are operating in a distributed power application of the vehicle system, and wherein at least one of the comparator subsystem or the control subsystem is configured to determine that the second pressure reading is invalid based on the difference in the first and second pressure readings.

2. The system according to claim 1, wherein the comparator subsystem is configured to determine the difference in the first and second pressure readings by comparing the first and second pressure readings.

3. The system according to claim 1, further comprising a communication network for reporting the first and second pressure readings from the first transducer and the second transducer, respectively, to the comparator subsystem.

4. The system according to claim 1, wherein the difference in the first and second pressure readings comprises a proportional difference between the first pressure reading and the second pressure reading and/or a direct difference between the first pressure reading and the second pressure reading over a nominal period of time.

5. The system according to claim 1, wherein the control subsystem is configured to control the vehicle system in a manner that disregards the second pressure reading when the second pressure reading is invalid.

6. The system according to claim 1, wherein the first powered unit and the second powered unit respectively comprise first and second linked-together vehicles, each of the first and second linked-together vehicles being selected from the group consisting of an off-highway vehicle, an agricultural vehicle, a mass transit or mass cargo transportation vehicle, a marine vessel, and/or a rail vehicle.

7. The system according to claim 1, wherein the first powered unit and the second powered unit are part of a consist within a series of linked powered units and/or are in separate consists within the series of linked powered units.

8. The system according to claim 1, wherein the vehicle system is a rail vehicle system comprising a series of linked rail vehicles, the first and second powered units being first and second rail vehicles, respectively, that are directly or indirectly linked together in the rail vehicle system.

9. The system according to claim 1, wherein said at least one of the comparator subsystem or the control subsystem is configured to determine that the second pressure reading is invalid when the second pressure reading is outside of a designated acceptable range based on the first pressure reading.

10. The system according to claim 1, wherein the braking or traction operations are configured to be based upon whether the second transducer is valid or invalid.

11. The system according to claim 1, wherein the system is configured to communicate a failure report to the control subsystem or to a controller of the system when the second pressure reading is invalid.

12. The system according to claim 1, wherein the first powered unit is a lead locomotive and the second powered unit is a remote locomotive, the control subsystem configured to receive commands from an operator of the lead locomotive, the control subsystem configured to control operations of the remote locomotive based on the commands.

13. The system according to claim 1, wherein the system is configured to use the second pressure reading to control at least one of the first and second powered units according to the distributed power application when the second pressure reading is determined to be valid and wherein the system is configured to not use the second pressure reading to control said at least one of the first and second powered units according to the distributed power application when the second pressure reading is determined to be invalid.

14. A system comprising:
a control subsystem configured to control at least one of braking or traction operations of a vehicle system that includes a first powered unit and a second powered unit that is remote from the first powered unit, each of the first and second powered units configured to provide a tractive effort to propel the vehicle system; and
a comparator subsystem configured to compare a first brake-pressure reading from a first transducer on the first powered unit and a second brake-pressure reading from a second transducer on the second powered unit, wherein the first and second brake-pressure readings are configured to be obtained when the first and second powered units are operating in a distributed power application, and wherein at least one of the comparator subsystem or the control subsystem is configured to consider the second brake-pressure reading as invalid when the second brake-pressure reading is outside of a predetermined operational parameter that is based on the first brake-pressure reading.

15. The system according to claim 14, wherein the comparator subsystem is configured to determine a difference between the first and second brake-pressure readings, the system configured to use the difference between the first and second brake-pressure readings to determine whether the second brake-pressure reading is invalid.

16. The system according to claim 14, wherein the control subsystem is configured to not use the second brake-pressure reading to control the braking or traction operations of the vehicle system when the second brake-pressure reading is considered invalid.

17. The system according to claim 14, wherein the braking or traction operations are configured to be based upon whether the second brake-pressure reading is considered valid or invalid.

18. The system according to claim 14, wherein the system is configured to communicate a failure report to the control subsystem or to a controller of the system when the second brake-pressure reading is outside of the predetermined operational parameter.

19. The system according to claim 14, wherein the vehicle system is a rail vehicle system comprising a series of linked rail vehicles, the first and second powered units being first and second rail vehicles, respectively, that are directly or indirectly linked together in the rail vehicle system.

20. The system according to claim 14, wherein the first powered unit is a lead powered unit and the second powered unit is configured to respond to operations in the lead powered unit.

* * * * *